July 13, 1965  A. WINKLER ETAL  3,194,140
SELF-TIMER ARRANGEMENTS, PARTICULARLY FOR AUTOMATIC CAMERAS
Filed June 20, 1962  2 Sheets-Sheet 2
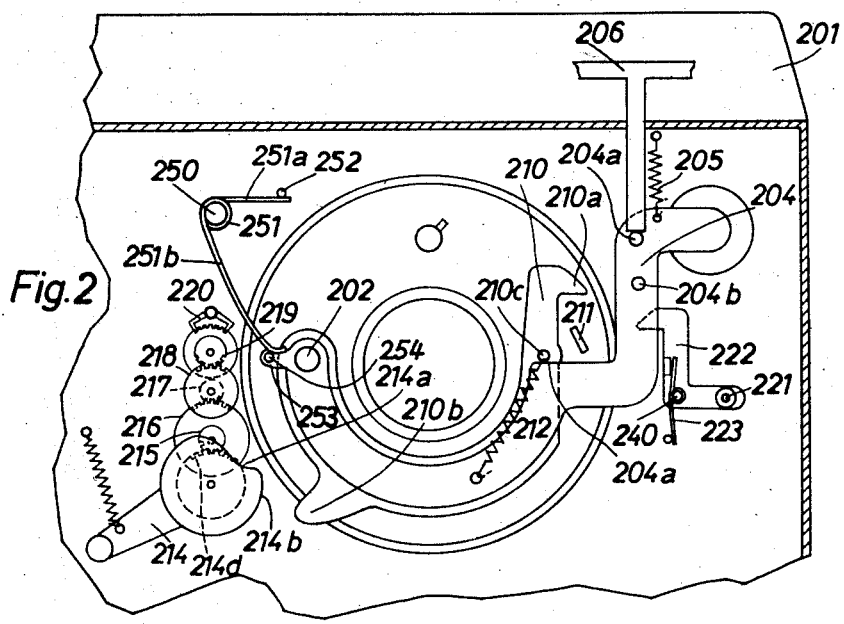
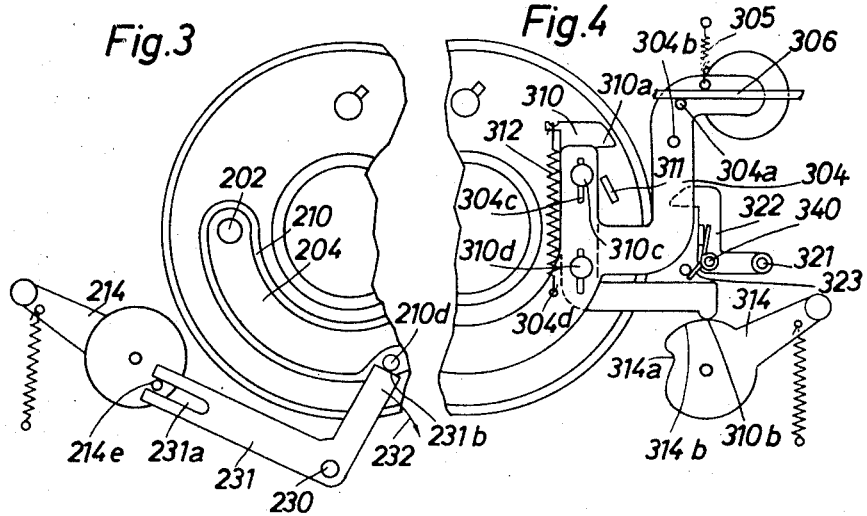
INVENTOR.
ALFRED WINKLER
WILFRIED HOFMANN
BY DIETER MAAS
HEINRICH STIERSTORFER
Michael S. Striker

United States Patent Office 3,194,140
Patented July 13, 1965

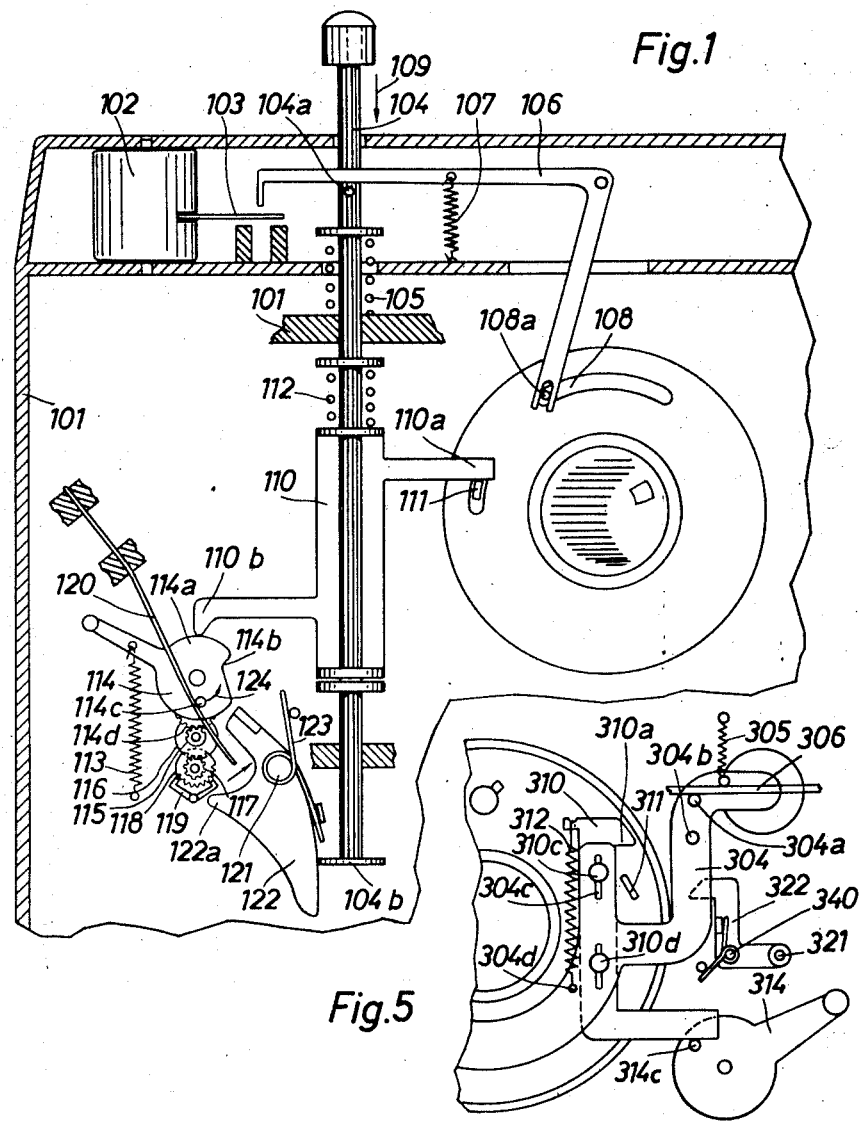

3,194,140
SELF-TIMER ARRANGEMENTS, PARTICULARLY FOR AUTOMATIC CAMERAS
Alfred Winkler, Wilfried Hofmann, Dieter Maas, and Heinrich Stierstorfer, Munich, Germany, assignors to Agfa Aktiengesellschaft, Leverkusen-Bayerwerk, a corporation of Germany
Filed June 20, 1962, Ser. No. 203,799
Claims priority, application Germany, Sept. 22, 1961, A 38,388
4 Claims. (Cl. 95—53.6)

The present invention relates to cameras.

More particularly, the present invention relates to automatic cameras which are capable of being automatically set in accordance with the lighting conditions and the present invention deals especially with a self-timer structure for such automatic cameras.

One of the objects of the present invention is to provide for an automatic camera of the above type a self-timer arrangement which will delay the tripping of the shutter for a given period of time and which at the same time is composed of exceedingly simple elements which are assembled together in an exceedingly compact assembly, so that with the structure of the invention the cost of the structure is very low and the space required by the structure is also extremely small.

Another object of the present invention is to provide for a camera of the above type a structure which will reliably prevent vibration of the camera resulting from the impact which occurs in conventional cameras when the manually operable release structure thereof is returned to its starting position by a spring of the camera.

With the above objects in view, the invention includes, in a camera which is capable of being automatically set according to the lighting conditions, a shutter release means for tripping the shutter of the camera and a spring means which cooperates with the shutter release means to urge the latter to its shutter releasing position. A manually operable means is capable of being actuated by the operator to release the shutter release means to the force of the spring means so that the latter will move the shutter release means to its shutter release position, and a self-timer means is capable of being moved by the operator from an inoperative to an operative position where the self-timer means prevents the spring means from placing the shutter release means in its shutter-releasing position until expiration of the predetermined period of time required for the self-timer means to run down.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a fragmentary, partly sectional, and partly diagrammatic illustration of one possible embodiment of a structure according to the present invention;

FIG. 2 is a fragmentary, partly sectional, and partly diagrammatic illustration of another embodiment of a structure according to the present invention;

FIG. 3 fragmentarily illustrates a variation of the structure of FIG. 2;

FIG. 4 fragmentarily illustrates a further variation of the structure of FIG. 2; and FIG. 5 illustrates yet another variation of a structure of the type shown in FIG. 2.

Referring to FIG. 1, there is shown therein a camera housing 101 which carries an electrical instrument 102 in the form of a galvanometer capable of registering variations in light intensity in a well known manner and having a rotor to which a pointer 103 is connected so that the position of the pointer 103 is indicative of the lighting conditions.

A manually operable means is provided to initiate the operation of the camera in order to make an exposure, and this manually operable means, in the embodiment of FIG. 1, takes the form of an elongated rod 104 which is supported by suitable bearings in the camera for axial movement, a spring 105 being coiled about part of the rod 104, engaging at its lower end a part of the housing 101, and engaging at its upper end a collar fixed to the rod 104 so as to urge the latter upwardly to a given starting position, the rod 104 being shown in FIG. 1 after it has been moved through a relatively slight distance downwardly from its starting position.

An elongated lever 106, having substantially the configuration of a bell crank, is supported for turning movement by a stationary pivot carried by a camera, and at its left end, as viewed in FIG. 1, the lever 106 carries a scanning structure which scans the position of the pointer 103 so that in accordance with the position of the pointer 103 the extent of angular turning of the lever 106 will be determined. A spring 107 is connected to the lever 106 to urge the latter to turn in a counterclockwise direction, as viewed in FIG. 1, and a pin 104a is fixedly carried by the rod 104 and is located beneath the upper arm of the lever 106, so that when the operator depresses the rod 104 the spring 107 will cause this upper arm of the lever 106 to follow the downward movement of the pin 104a until the scanning member carried by the left end of the lever 106 of FIG. 1 engages the pointer 103, the spring 105 of course being stronger than the spring 107. The downwardly directed arm of the lever 106 is formed at its free end with a slot or notch receiving a pin 108a which is fixed to a rotary member in the shutter housing of the objective assembly, and this rotary member 108 will set the diaphragm and/or exposure time of the camera in a well known way. Thus, when the operator moves the rod 104 downwardly in the direction of the arrow 109 the spring 107 will turn the lever 106 so that it displaces the element 108 in order to adjust the setting of the camera and this adjustment will continue until the scanning member which is carried by the lever 106 engages the pointer 103, so that in this way the camera is automatically set in accordance with the lighting conditions.

In addition to being provided with the manually operable means 104, the camera of FIG. 1 is provided with a shutter release means 110 which is adapted to actuate the shutter release member 111 by moving the latter downwardly, this shutter release member 111 being of a conventional construction and in a well known manner tripping the shutter so as to make an exposure when the member 111 is moved downwardly. The shutter release means 110 may be in the form of a sleeve which coaxially surrounds the rod 104 and is axially slidable therealong, although in the illustrated example the shutter release means 110 takes the form of a plate having at its upper and lower ends ears respectively located in planes perpendicular to the rod 104 and formed with openings through which the rod 104 freely passes, so that in this way the shutter release means 110 is guided for axial movement with respect to the rod 104, and any suitable structure such as a key and keyway may be provided to prevent the plate 110 from turning about the axis of the rod 104, as well as to prevent the rod 104 from turning about its axis, so that the various parts will only move vertically. A spring 112 is coiled about the rod 104 and engages at its upper end a collar which is fixed to the rod 104 and which engages a part of the housing 101 to limit the upward movement of the rod 104 by the spring 105, and the bottom end of the spring 112 bears against the top end of the plate 110 to urge the latter downwardly into engagement with an additional collar which is fixed to the rod 104 and which is located beneath the plate 110. Thus, with this construction when the operator moves the rod 104 downwardly in the direction of the arrow 109 the shutter release means 110 will move downwardly with the rod 104 unless certain elements prevent such movement in opposition to the spring 112. The shutter release means 110 includes an arm 110a which extends over the shutter tripping element 111 so that during the downward movement of the rod 104 the shutter will be tripped in order to make an exposure, and the parts are so designed that the lever 106 will have positioned the diaphragm and/or exposure time determining structure in accordance with the lighting conditions before the arm 110a moves the element 111 sufficiently to trip the shutter. The shutter release means 110 also includes an arm 110b, and this arm 110b cooperates with a self-timer means shown in the lower left portion of FIG. 1 and available to the operator when it is desired to delay the tripping of the shutter for a given period of time.

The self-timer means includes a rotary cam 114 having a lever arm integral with and extending therefrom so that the operator by engaging this lever arm can turn the cam 114. A spring 113 is connected to this lever arm to urge the latter and the cam 114 therewith to a given rest position where the self-timer means is inoperative. The self-timer means is shown in FIG. 1 in its operative position, the cam 114 having been turned by the operator in opposition to the spring 113 to the illustrated position before the rod 104 was depressed in order to make the exposure. The camming portion 114a of the cam 114 has a circular peripheral portion shown in engagement with the arm 110b in FIG. 1 and next to this circular peripheral portion a camming portion 114b in the form of an indentation at the periphery of the cam 114, as shown in FIG. 1, and in addition the cam 114 fixedly carries a pin 114c. Furthermore, the cam 114 is fixedly connected with a gear sector 114d meshing with the first gear 115 of a gear train 115–118, the last gear 118 of which is in the form of an escapement wheel cooperating with the escapement anchor 119. When the self-timer means 114–119 is in its rest or inoperative position the indentation 114b is in the path of movement of the free end of the arm 110b, so that at this time the shutter release means 110 can continue to move with the rod 104 in order to trip the shutter and make the exposure after the camera has been automatically set in accordance with the lighting conditions, and thus in this inoperative position of the self-timer means the self-timer means has no influence on the operation of the camera.

A releaseable holding lever means 122 is provided for releasably holding the manually operable means 104 in its depressed position until the self-timer means runs down, and this holding lever means is in the form of the lever 122 which is supported for turning movement by a stationary pivot pin 121 carried by any suitable stationary part of the camera, and a spring 123 is coiled about the pin 121, engages a lug of the lever 122, and engages a stationary pin of the camera so that the spring 123 urges the lever 122 to turn in a counterclockwise direction, as viewed in FIG. 1. The rod 104 fixedly carries at its bottom end a plate 104b, and in the position of the parts illustrated in FIG. 1, where the self-timer means has been placed in its operative position, the spring 123 will move the lever 122 in a counterclockwise direction, as soon as the plate 104b moves beyond the lower end of the lever 122, so that in this way the lever 122 will be located at the upper side of the plate 104b to prevent the rod 104 from being returned to its starting position by the spring 105. However, when the self-timer means is in its inoperative position, the cam 114 is displaced in a counterclockwise direction from the position thereof shown in FIG. 1, and thus the pin 114c is also displaced in the same direction. A leaf spring 120 which is stronger than the spring 123 engages a lug of the lever 122 when the self-timer means is in its inoperative position so as to prevent the spring 123 from turning the lug 122 to the illustrated position where it is in readiness to move over the plate 104b. Thus, under conditions where the self-timer means is not placed by the operator in its operative position, the holding lever means 122 does not influence the operation of the camera. However, when the operator turns the cam 114 in a clockwise direction to the illustrated position in opposition to the spring 113, the pin 114c moves the leaf spring 120 to the illustrated position where it no longer engages the lever 122, so that now the lever 122 can be moved by the spring 123 from the release position to the holding position where it holds the rod 104 against return movement by the spring 105. Moreover, it will be noted that when the self-timer means has been placed by the operator in the illustrated operative position the shutter release 110 will only move together with the rod 104 to the illustrated position where the arm 110b engages the camming portion 114a of the cam 114, and thereafter the further movement of the rod 104 is in opposition to the spring 112 as well as the spring 105 since the shutter release means can no longer follow the movement of the rod 104 and thus tripping of the shutter is prevented until the self-timer means runs down. In the inoperative position of the self-timer means 113–119, the spring 120 maintains the lever 122 in a position which is displaced in a clockwise direction from that illustrated in FIG. 1, and in this position the projection 122a of the lever 122 is displaced to the right, as viewed in FIG. 1, beyond the escapement anchor 119. However, when the operator turns the cam 114 in opposition to the spring 113 to the illustrated position where the self-timer means 113–119 is in its operative position, the spring 120 will be displaced away from the lever 122 in the manner described above, and the spring 123 will turn the lever 122 to the illustrated position where it engages the edge of the plate 104b, and the lever 122 reaches the illustrated position when the self-timer means has been fully cocked, and in this position the projection 122a is located directly next to the anchor 119 so as to prevent the self-timer means from operating and thus the lever 122 when it is in its release position also cooperates with the self-timer means to maintain the latter in its cocked position and to prevent it from running down. As soon as the plate 104b moves below the bottom end of the lever 122, however, the spring 123 will turn the lever 122 in a counterclockwise direction so that its bottom end moves over the plate 104b, and this will result in turning of the projection 122a of the lever 122 downwardly away from the anchor 119, so that simultaneously with the movement of the holding lever means 122 into its holding position, this holding lever means also acts to release the self-timer means for operation, and thus the delay period required for the running down of the self-timer means starts simultaneously with the movement of the lever 122 into its holding position.

Thus, the parts are shown in FIG. 1 in the position where the operator has elected to place the self-timer means into operation and in the position where the rod 104 has been depressed sufficiently to place the shutter release means 110 in engagement with the self-timer means so that the latter now cooperates with the shutter release means to prevent the latter from being moved by the spring 112 into its shutter-releasing position. The operator of course continues to depress the manually operable means 104, and this depression will continue until the holding lever means 122 moves to the upper side of the plate 104b, so as to prevent return of the manually operable means 104 and so as to initiate the operation of the self-timer means. In the meantime, the automatic structure has operated in the above-described manner to automatically set the camera so that it will make an exposure in accordance with the lighting conditions, and since the rod 104 is maintained by the lever 122 in its depressed position, the automatic setting of the camera which is made by the light-responsive automatic structure will be maintained. Of course, as soon as the lever 122 releases the self-timer means for operation, the spring 113 starts to turn the cam 114 in the direction of the arrow 124, and of course the drive is retarded by the escapement mechanism 118, 119, so that a predetermined period of time will be required for running down of the self-timer means. As the self-timer means approaches the end of its running down movement, the spring 120 will engage and press against the lever 122, and the pin 114c will in fact move beyond the spring 120, and at the same time the indentation 114b will reach the arm 110b so that the shutter release means will now be advanced to its shutter release position moving the element 111 so as to trip the shutter.

As was pointed out above, spring 120 is stronger than the spring 123. If the extent to which the spring 120 is stronger than the spring 123 were so great that the spring 120 could immediately turn the lever 122 back to its release position, the result would be that at the end of the running down of the self-timer means the shutter would be tripped and immediately thereafter the rod 104 would be released to the spring 105 for return to its starting position, and the impact between the collar engaging the upper end of the spring 112 and the camera housing 101 would provide a highly undesirable vibration of the camera. Therefore, in accordance with the present invention, the spring 120 while being stronger than the spring 123 is not stronger than the force of the spring 123 plus the force of friction between the lever 122 and the plate 104b, so that the spring 120 in fact cannot move the lever 122 away from the plate 104b until the friction with which these elements engage each other is eliminated. The parts are so designed that when the rod 104 has been lowered to the position where the lever 122 engages the upper side of the plate 104b, this rod 104 can still be lowered through an additional increment, and thus at the end of the running down of the self-timer means after the exposure has been made the operator will with the camera of the invention depress the rod 104 by a further distance so as to displace the plate 104b slightly beyond the lever 122 and now the spring 120 will be capable of returning the lever 122 to its release or rest position where it has no influence on the operation of the camera. Thus, the result is that with the structure of the invention the hand of the operator is necessary on the rod 104 at the moment when the latter is released for return to its starting position and therefore the operator is compelled to resist the full force with which the spring 105 seeks to return the rod 104 to its starting position and in this way the operator will, perhaps quite unconsciously, prevent the rod 104 from being suddenly moved back to its starting position with the resulting impact and vibration referred to above. It should be noted that when the rod 104 is depressed by the operator through the additional increment necessary to displace the plate 104b beyond the bottom end of the lever 122, the arm 110b engages the cam 114 in the depression 114b thereof so that the shutter release means 110 does not follow the movement of the rod 104 when it is displaced through the above-mentioned additional increment, and in this way undesired pressure by the spring 112 on the element 11, after the latter has been displaced by the shutter release means 110 to the shutter-releasing position, is avoided. When the parts have returned to their rest position the operator can actuate a conventional lever which sets into operation a conventional drive for transporting the next film frame into position to be exposed, and for cocking the shutter again. The element 11 of course returns to its upper position so as to again be actuated by the arm 110a during the next exposure.

The embodiment of the invention which is illustrated in FIG. 2 will accomplish the same results as the above-described embodiment of FIG. 1. However, in the embodiment of FIG. 2, the manually operable means, instead of taking the form of an elongated rod 104 which is axially movable, takes the form of a lever 204 which is supported for turning movement by a pivot pin 202 which is carried by the shutter housing. A spring 205 is operatively connected to the lever 204 to urge the latter to turn to the illustrated rest position. The automatic structure for automatically setting the camera in accordance with the lighting conditions is not illustrated in FIG. 2. The structure may take the form shown in FIG. 1, and in this case the lever 204 would have an extension carrying a part which extends beneath the upper arm of lever 206 so that when the lever 204 is turned in a clockwise direction, as viewed in FIG. 2, in opposition to the spring 205, the automatic setting structure will be released to automatically set the camera in accordance with the lighting conditions. The shutter release means of the embodiment of FIG. 2 also takes the form of a lever, the shutter release lever being shown at 210, and in this embodiment of the invention both of the levers 204 and 210 are mounted for turning movement on the common pivot pin 202, so that the pair of levers which form the manually operable means and the shutter release means of the embodiment of FIG. 2 have a common turning axis. A spring means formed by the spring means 212, is connected at one end to the manually operable means formed by the lever 204 and at its opposite end to a pin 210c which is fixed to the shutter release lever 210, so that the spring 212 seeks to turn the shutter release lever 210 in a clockwise direction with respect to the lever 204, and the pin 210c engages the edge 204a of the lever 204 so as to limit the turning of the lever 210 with respect to the lever 204. A releasable holding lever is also provided in the embodiment of FIG. 2 for releasably holding the lever 204 in the position to which it is moved by the operator when the operator moves the lever 204 in a clockwise direction away from the starting position thereof shown in FIG. 2, and the holding lever means of FIG. 2 takes the form of the lever 222 which is supported for turning movement by the stationary pivot 240 and which is urged by the spring 223 to turn in a counterclockwise direction, as viewed in FIG. 2. When the lever 204 is turned by the operator in opposition to the spring 205, the pin 204b, which extends to the side of lever 204 which is not visible in FIG. 2, approaches and snaps behind the upper left end of the lever 222 as viewed in FIG. 2, so that the holding lever means 222 releasably holds the lever 204 in position to which it is turned by the operator. The lever 222 carries a handle 221 accessible to the operator so that, after an exposure is made, the operator may grasp the handle 221 and turn the lever 222 in a clockwise direction, as viewed in FIG. 2, in opposition to the spring 223, for turning lever 222 away from the pin 204b so as to release the lever 204 for return movement by the spring 205 back to its starting position. The only part of the structure for automatically setting the camera in accordance with the lighting conditions is shown at 206 in FIG. 2, element 206 being a lever corresponding to the lever 106 of FIG. 1 and cooperating with a light meter and with the diaphragm and/or exposure time setting structure in the same way. The lever 206 which is fragmentarily illustrated in FIG. 2 has an extension which presses against the pin 204a carried by the lever 204 and urged into engagement with the pin 204a by a spring which is weaker than the spring 205. Thus, when the operator turns the lever 204 the lever 206 will follow the pin 204a until the scanning portion of the lever 206 engages the pointer of the light meter.

The self-timer means shown in FIG. 2 includes the lever 214 which is urged by the illustrated spring which is connected thereto to turn in a clockwise direction, this lever 214 being fixed to a cam 214b as well as to a gear 214d which meshes with the gear train 215–219, and the final gear of the gear train, namely the gear 219, is fixed coaxially with a rotary escapement wheel which cooperates with the escapement anchor 220. The self-timer means is shown in FIG. 2 in its operative position, and it will be noted that in this position the outer circular part of the periphery of the cam 214b is located in the path of movement of a projection 210b of the shutter release lever 210. Therefore, when, with the self-timer means 214–220 in the illustrated operative position, the operator turns the manually operable means 204 in a clockwise direction, as viewed in FIG. 2, in order to initiate the operations which will result in an exposure, the shutter release means 210 will follow the lever 204 under the action of the spring 212, but only until the projection 210b engages the outer circular peripheral portion of the cam 214b, and this extent of turning movement will be insufficient for the free end portion 210a of the shutter release lever 210 to engage and move the shutter tripping element 211 through a distance sufficient to trip the shutter. It is only when the spring of the self-timer means has run the latter down to an extent sufficient to locate the depression 214a of the cam in alignment with the projection 210b, that the spring 212 will be capable of moving the shutter release lever 210 further in a clockwise direction, as viewed in FIG. 2, in order to trip the shutter, and in this way the structure of FIG. 2 operates also to delay the tripping of the shutter for a period of time determined by the running down period of the self-timer means. The self-timer means of FIG. 2 is cocked and released generally in the same way as the self-timer means of FIG. 1. As may be seen from FIG. 2, a wire spring 251 is coiled about a stationary pin 250 and has one leg 251a engaging a stationary pin 252. This spring 251 has a second leg 251b which normally engages the anchor 220 to prevent operation of the self-timer means even after the latter has been cocked. The lever 204, however, has an extension 253 carrying the pin 254 which engages the leg 251b for displacing it away from the anchor 220 when the lever 204 is turned from its starting position, and the lever 204 is shown in FIG. 2 displaced slightly from its starting position. Thus, whenever the lever 204 is turned by the operator, the pin 254 will move the leg 251b of the spring 251 away from anchor 220 so that if the self-timer 214–220 has been previously cocked, it will now start to run down. Of course, the lever 222 cooperates with the pin 204b to maintain the lever 204 in a position where the pin 254 maintains the leg 251b of the spring 251 displaced from the anchor 220 and it is not until the operator engages the handle 221 and turns the lever 222 away from the pin 204b that the parts will return to their initial positions where the spring 251 again cooperates at its leg 251b with the anchor 220 to prevent the operation of the self-timer means. As long as the self-timer means is in its inoperative position where the indentation 214a of the cam is in the path of movement of the projection 210b of the lever 210, the self-timer means does not enter into the operation of the camera.

The structure of FIG. 3 is the same as that of FIG. 2 with the exception of the cooperation of the self-timer means with the shutter release lever 210. Thus, the lever 214 of the self-timer means of FIG. 3 is connected only to a circular disc which carries a pin 214e, and this pin is received in an elongated slot or notch 231a formed in a bell crank 231 which is supported for turning movement on a stationary pin 230 and which has its free end 231b in the path of movement of the pin 210d which is fixed to the lever 210, assuming that the self-timer means has been placed in the illustrated operative position. With the embodiment of FIG. 3 the lever 214 is turned in a clockwise direction to place the self-timer means in its operative position, and when running down the lever 214 turns in a counterclockwise direction, as viewed in FIG. 3, so that the pin 214e will turn the lever 231 in a clockwise direction, moving the free end 231b of the lever 231 in the direction of the arrow 232, so that just before the self-timer means reaches the end of its running down movement the end 231b of the lever 231 will move beyond the pin 210d and thus release the shutter release lever 210 to the force of the spring 212 which now moves the lever 210 in order to cause the latter to shift the shutter tripping element 211 in the manner described above. As long as the self-timer means of FIG. 3 is in its inoperative position the lever 231 is displaced in a clockwise direction from the position thereof shown in FIG. 3 and in the position where the lever is out of the path of movement of the pin 210d, so that the self-timer means will not enter into the operation of the camera at this time.

In the embodiment of the invention which is illustrated in FIG. 4, the lever 304 forms the manually operable means and corresponds in general to the lever 204 described above and operates exactly the same way. However, the lever 304 is provided with a pair of elongated slots 304c. The lever 304 is provided in the same way as in the embodiment of FIG. 2 with a pin 304b which cooperates with the holding lever means, so that the lever 304 will not be returned by the spring 305 to its rest position until the lever 322, which corresponds to the lever 222 of FIG. 2, is turned away from the pin 304b, and it will be noted that the lever 322 is pivotally supported by a stationary pin 340 and is acted upon by the spring 323 which corresponds to the spring 223 of FIG. 2. The operator turns the lever 322 of FIG. 4 by engaging the handle 321 carried thereby and corresponding to the handle 221 of FIG. 2, and also the release of the automatic setting structure takes place in the same way, FIG. 4 showing a portion of a lever 306 corresponding to the lever 106 of FIG. 1, this portion being urged by a spring into engagement with the pin 304a carried by the lever 304 so that, when this lever is turned, the lever 306 will follow the pin 304a until the scanning portion of lever 304 engages the pointer of the light meter.

However, the shutter release means 310 of the embodiment of FIG. 4 is quite different from that of the other embodiments. The shutter release means 310 takes the form of a substantially L-shaped member which fixedly carries a pair of pins 310c and 310d which have portions extending freely through the slots 304c and which have head ends illustrated in FIG. 4 extending beyond the side edges of the slots 304c, so that with this embodiment the shutter release means 310 is connected to the manually operable means 304 through the illustrated pin-and-slot connection. The shutter release means 310 is actuated by spring means 312 which is connected at one end to the shutter release means and at its opposite end to a pin 304d which is carried by the lever 304. Thus, the spring 312 urges the shutter release member 310 to move to the position where the pins 310c and 310d are located at the lower ends of the slots 304c, as viewed in FIG. 4. If the self-timer means is in its inoperative position, then the shutter release means 310 simply turns with the lever 304 and the portion 310a of the shutter release means 310 will engage the shutter tripping element 311 to move the latter and trip the shutter in the usual way, so that the self-timer means does not enter into the operation at this time. The self-timer means 314 is shown in its cocked position in FIG. 4 and it includes a cam having a circular camming portion 314b and an indentation 314a. When the lever 314 is displaced in a clockwise direction from the position thereof shown in FIG. 4 so that the lever 314 is in its rest or inoperative position, the indentation 314a is located in the path of movement of the end portion 310b of the shutter release element 310, and this will provide a sufficient extent of movement of the lever 304 while the portion 310b enters into the depression 314a to enable the portion 310a of the shutter release member 310 to engage and move the element 311 so as to trip the shutter. However, in the illustrated operative position of the self-timer means of FIG. 4, the circular portion 314b of the self-timer means will engage the portion 310b of the shutter release means 310, so that at this time when the lever 304 is turned in order to initiate the operations which will result in an exposure, the shutter release means 310 will be incapable of moving to an extent sufficient to trip the shutter, and only when the self-timer means is almost run down so that the indentation 314a receives the portion 310b of the shutter release means 310 will the spring 312 be capable of shifting the element 310 so as to cause the portion 310a thereof to engage and move element 311 so as to trip the shutter. The self-timer means of FIG. 4 is cocked and released in the manner described above in connection with FIG. 1 and also the holding lever 322 of FIG. 4 cooperates with the pin 304b of the lever 304 in the manner described above.

The embodiment of the invention which is illustrated in FIG. 5 is substantially identical with that of FIG. 4 and the same reference characters are used. The only difference is that the element 314 of the self-timer means does not include a cam and instead includes a simple disc which carries a pin 314c. Moreover, the self-timer means does not have a spring which must be tensioned when the self-timer means is placed in its operative position and which drives the self-timer means during its running down period. Instead, with the embodiment of FIG. 5 the lever 314 is simply moved by the operator to the illustrated position in a clockwise direction, and when the self-timer means runs down the lever 314 turns in a counter-clockwise direction, as viewed in FIG 5. With this embodiment the spring 312 which acts on the shutter release means 310 also drives the self-timer means through the shutter release means 310. Thus, after the self-timer means has been placed in the illustrated operative position and the operator turns the lever 304 in opposition to the spring 305, the shutter release means 310 will engage the pin 314c, and as the operator continues to turn the lever 304 the spring 312 will be tensioned since it attempts to cause the shutter release means 310 to move together with the lever 304, and therefore the tensioned spring 312 acts through the shutter release means 310 on the pin 314c to drive the entire self-timer means, and only after the period of time required to turn the element 314 in a counterclockwise direction back to its rest position has expired will the spring 312 have displaced the shutter release means 310 to an extent sufficient to trip the shutter. Thus, with the embodiment of FIG. 5 the spring 312 serves not only to urge the shutter release means 310 to its shutter releasing position, but in addition the spring serves to drive the self-timer means after the latter has been placed in its operative position.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera capable of being automatically set according to the lighting conditions, in combination, shutter release means; spring means urging said shutter release means to a shutter-releasing position; manually operable means holding said shutter release means in a rest position in opposition to said spring means, said manually operable means when actuated by the operator releasing said shutter release means to said spring means to be moved thereby to said shutter-releasing position; self-timer means movable, at the option of the operator, between an inoperative position where it does not influence the operation of the camera and an operative position where, after actuation of said manually operable means, said self-timer means delays movement of said to be moved thereby to said shutter-releasing position; thereof by said spring means for a given period of time; second spring means cooperating with said manually operable means for urging the latter to return to a given starting position after said manually operable means has been moved by the operator in opposition to said second spring means away from said starting position; holding lever means having a holding position cooperating with said manually operable means for preventing return thereof by said second spring means to said starting position and a release position releasing said manually operable means for return to said starting position by said second spring means; third spring means cooperating with said holding lever means for urging the same to said holding position thereof; and fourth spring means stronger than said third spring means, said self-timer means after having been placed in said operative position thereof and after having almost completed its running down cooperating with said fourth spring means to place the latter in operative engagement with said holding lever means to urge the latter in opposition to said third spring means from said holding to said release position thereof.

2. In a camera capable of being automatically set according to the lighting conditions, in combination, shutter release means; spring means urging said shutter release means to a shutter-releasing position; manually operable means holding said shutter release means in a rest position in opposition to said spring means, said manually operable means when actuated by the operated releasing said shutter release means to said spring means to be moved thereby to said shutter-releasing position; self-timer means movable, at the option of the operator, between an inoperative position where it does not influence the operation of the camera and an operative position where, after actuation of said manually operable means, said self-timer means delays movement of said shutter release means to said shutter-releasing position thereof by said spring means for a given period of time; second spring means cooperating with said manually operable means for urging the latter to return to a given starting position after said manually operable means has been moved by the operator in opposition to said second spring means away from said starting position; holding lever means having a holding position cooperating with said manually operable means for preventing return thereof by said second spring means to said starting position and a release position releasing said manually operable means for return to said starting position by said second spring means; third spring means cooperating with said holding lever means for urging the same to said holding position thereof; and fourth spring means stronger than said third spring means, said self-timer means after having been placed in said operative position thereof and after having almost completed its running down cooperating with said fourth spring means to place the latter in operative engagement with said holding lever means to urge the latter in opposition to said third spring means from said holding to said release position thereof, said fourth spring means while being stronger than said third spring means nevertheless being too weak to move said holding lever means from said holding to said release position thereof in opposition to said third spring means plus the force of friction between said holding lever means and said manually operable means when the latter is held against return to its starting position by said holding lever means, whereby it is necessary for the operator to move said manually operable means slightly beyond the position it takes when held by said holding lever means to eliminate the friction between said holding lever means and manually operable means so that said fourth spring means will then move said holding lever means to said release position thereof, and thus the operator's hand is necessarily on said manually operable means when the latter is returned to said starting position thereof by said second spring means to prevent the undesirable vibration of the camera and impact between said manually operable means and other parts of the camera which would otherwise occur.

3. In a camera capable of being automatically set according to the lighting conditions, in combination, shutter release means; spring means urging said shutter release means to a shutter-releasing position; manually operable means holding said shutter release means in a rest position in opposition to said spring means, said manually operable means when actuated by the operator releasing said shutter release means to said spring means to be moved thereby to said shutter-releasing position, self-timer means movable, at the option of the operator, between an inoperative position where it does not influence the operation of the camera and an operative position where, after actuation of said manually operable means, said self-timer means delays movement of said shutter release means to said shutter-releasing position thereof by said spring means for a given period of time; second spring means cooperating with said manually operable means for urging the latter to return to a given starting position after said manually operable means has been moved by the operator in opposition to said second spring means away from said starting position; holding lever means having a holding position cooperating with said manually operable means for preventing return thereof by said second spring means to said starting position and a release position releasing said manually operable means for return to said starting position by said second spring means; third spring means cooperating with said holding lever means for urging the same to said holding position thereof; and fourth spring means stronger than said third spring means, said self-timer means after having been placed in said operative position thereof and after having almost completed its running down cooperating with said fourth spring means to place the latter in operative engagement with said holding lever means to urge the latter in opposition to said third spring means from said holding to said release position thereof, said holding lever means when in its release position cooperating with said self-timer means after the latter has been placed in its operative position to prevent the starting of the operation of said self-timer means until said holding lever means moves from said release to said holding position thereof.

4. In a camera capable of being automatically set according to the lighting conditions, in combination, a shutter; shutter release means; spring means urging said shuttter release means to a shutter-releasing position; manually operable means holding said shutter release means in a rest position in opposition to said spring means, said manually operable means when actuated by the operator releasing said shutter release means to said spring means to be moved thereby to said shutter-releasing position; means for automatically setting the exposure time of said shutter according to the lighting conditions when released by said shutter release means; and self-timer means movable, at the option of the operator, between an inoperative position where it does not influence the operation of the camera and an operative position where, after actuation of said manually operable means, said self-timer means delays movement of said shutter release means to said shutter-releasing position thereof by said spring means for a given period of time, said manually operable means being in the form of an elongated, axially shiftable rod, and said shutter release means having at least a portion which surrounds said rod and is axially slidable therealong.

References Cited by the Examiner

UNITED STATES PATENTS

| | | | |
|---|---|---|---|
| 2,619,171 | 11/52 | Goldhammer | 95—53.6 |
| 2,935,005 | 5/60 | Barth | 95—53.6 |
| 2,979,999 | 4/61 | Rentschler | 95—53.6 X |
| 2,984,168 | 5/61 | Rentschler | 95—53.6 |
| 3,007,387 | 11/61 | Rentschler | 95—53 |

NORTON ANSHER, *Primary Examiner.*

D. B. LOWE, *Examiner.*